United States Patent
Yen

(10) Patent No.: US 10,523,022 B2
(45) Date of Patent: Dec. 31, 2019

(54) POWER MANAGEMENT CIRCUIT FOR DYNAMICALLY CUT-OFF VOLTAGE OF BATTERY

(71) Applicant: Quanta Computer Inc., Taoyuan (TW)

(72) Inventor: Wei-Ting Yen, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 104 days.

(21) Appl. No.: 15/843,120

(22) Filed: Dec. 15, 2017

(65) Prior Publication Data

US 2019/0157883 A1   May 23, 2019

(30) Foreign Application Priority Data

Nov. 17, 2017   (TW) .............................. 106139881 A

(51) Int. Cl.
*H01M 10/46* (2006.01)
*H02J 7/00* (2006.01)

(52) U.S. Cl.
CPC .......... *H02J 7/0031* (2013.01); *H02J 7/0063* (2013.01); *H02J 2007/004* (2013.01); *H02J 2007/0067* (2013.01)

(58) Field of Classification Search
CPC ............... H02J 2007/004; H02J 7/0063; H02J 2007/0067
USPC .......................... 320/127, 129, 131, 135, 136
See application file for complete search history.

(56) References Cited

U.S. PATENT DOCUMENTS

| | | | |
|---|---|---|---|
| 4,086,525 A | 4/1978 | Ibsen et al. | |
| 5,825,155 A * | 10/1998 | Ito | G01R 19/16542 320/118 |
| 6,181,103 B1 * | 1/2001 | Chen | G06F 1/263 320/106 |
| 6,502,044 B1 * | 12/2002 | Lane | H02J 7/0029 363/101 |

(Continued)

FOREIGN PATENT DOCUMENTS

| | | |
|---|---|---|
| JP | S59-122328 | 7/1984 |
| JP | 2006-112786 A | 4/2006 |

(Continued)

OTHER PUBLICATIONS

Chinese language office action dated Apr. 24, 2018, issued in application No. TW 106139881.

(Continued)

*Primary Examiner* — Edward Tso
(74) *Attorney, Agent, or Firm* — McClure, Qualey & Rodack, LLP

(57) ABSTRACT

A power management circuit for a battery cell is provided. The battery cell is coupled to a load through an output terminal. The power management circuit includes a current detection circuit, a loading determination circuit, and a voltage determination circuit. The current detection circuit detects a discharge current of the battery cell when the battery cell is discharged through the load to generate a discharge-current signal. The loading determination circuit determines a loading value of the load according to the discharge-current signal to generate a loading signal. When the battery voltage of the battery cell drops to the cut-off voltage, the power management circuit terminates the discharge of the battery cell through the load.

9 Claims, 4 Drawing Sheets

(56) References Cited

U.S. PATENT DOCUMENTS

| | | |
|---|---|---|
| 7,589,534 B2 | 9/2009 | Lee |
| 2006/0076929 A1 | 4/2006 | Tatsumi et al. |
| 2012/0286591 A1 | 11/2012 | Schiemann et al. |
| 2016/0190830 A1* | 6/2016 | Kuhlmann ............ H02J 7/0026 320/116 |

FOREIGN PATENT DOCUMENTS

| | | |
|---|---|---|
| JP | 2013-217931 A | 10/2013 |
| KR | 10-2001-0036801 A | 5/2001 |
| KR | 10-1320295 B1 | 10/2013 |
| TW | 201603445 A | 1/2016 |

OTHER PUBLICATIONS

European Search Report dated Jun. 1, 2018, issued in application No. 18150111.5-1202.
Japanese language office action dated Feb. 6, 2019, issued in application No. JP 2018-026587.
Korean language office action dated Sep. 17, 2018, issued in application No. KR 10-2018-0006122.

* cited by examiner

POWER MANAGEMENT CIRCUIT FOR DYNAMICALLY CUT-OFF VOLTAGE OF BATTERY

CROSS REFERENCE TO RELATED APPLICATIONS

This Application claims priority of Taiwan Patent Application No. 106139881, filed on Nov. 17, 2017, the entirety of which is incorporated by reference herein.

BACKGROUND OF THE INVENTION

Field of the Invention

The invention relates to a power management circuit, and more particularly to a power management circuit which dynamically adjusts a cut-off voltage of a battery according to loading, thereby increasing the battery capacity.

Description of the Related Art

In general, most batteries currently used in electronic products are lithium batteries. In order for a lithium battery pack to work normally and to extend the usage time of the lithium battery cell, the lithium battery pack must generally have several important voltage thresholds for starting various operations/modes of the lithium battery pack, such as a cut-off voltage, an over-voltage protection threshold voltage, an under-voltage protection (UVP) threshold voltage, a shutdown voltage, a safety under voltage protection (SUVP) threshold voltage, etc., The cut-off voltage refers to the minimum voltage of the lithium battery cell that can be discharged through a load. When the voltage of the lithium battery cell drops lower than the cut-off voltage, the lithium battery cell cannot be discharged through the load anymore. For a lithium battery pack, its cut-off voltage has been preset when it leaves the factory. Therefore, regardless of the magnitude of the load of the lithium battery pack, the lithium battery pack stops supplying power to the load when the voltage of the lithium battery cell drops to the cut-off voltage. FIG. 1 shows, for the same lithium battery pack, falling curves of a voltage of a lithium battery cell at different loads, wherein the relationship between the magnitudes of the loads L10~L14 respectively corresponding to the curves 10~14 is L10>L11>L12>L13>L14. Referring to FIG. 1, when the load is larger, the voltage of the lithium battery cell drops faster; when the load is smaller, the voltage of the lithium battery cell drops more slowly. The discharge rate of the lithium battery cell is about 85% when the curve 10 of the heavy load L10 falls to the cut-off voltage (e.g., 3.0V). The discharge rate of the lithium battery cell is about 100% when the curve 10 of the light load L14 falls to the cut-off voltage (e.g., 3.0V). Therefore, it can be learned that the battery capacity of the lithium battery pack provided a heavy load is less than the battery capacity of the lithium battery provided a light load. As a result, the capacity of the lithium battery cell cannot be fully used, reducing the working efficiency of the lithium battery pack.

BRIEF SUMMARY OF THE INVENTION

An exemplary embodiment of a power management circuit for a battery cell is provided. The battery cell is coupled to a load through an output terminal. The power management circuit comprises a current detection circuit, a loading determination circuit, and a voltage determination circuit. The current detection circuit detects a discharge current of the battery cell when the battery cell is discharged through the load to generate a discharge-current signal. The loading determination circuit determines a loading value of the load according to the discharge-current signal to generate a loading signal. When the battery voltage of the battery cell drops to the cut-off voltage, the power management circuit terminates the discharge of the battery cell through the load.

An exemplary embodiment of a power management method for a battery cell is provided. The power management method comprises the following steps: when the battery cell is discharged through a load, detecting a loading of the load to generate a loading value; determining a cut-off voltage of the battery cell according to the loading value; and terminating the battery being discharged through the load when a battery voltage of the battery cell drops to the cut-off voltage.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
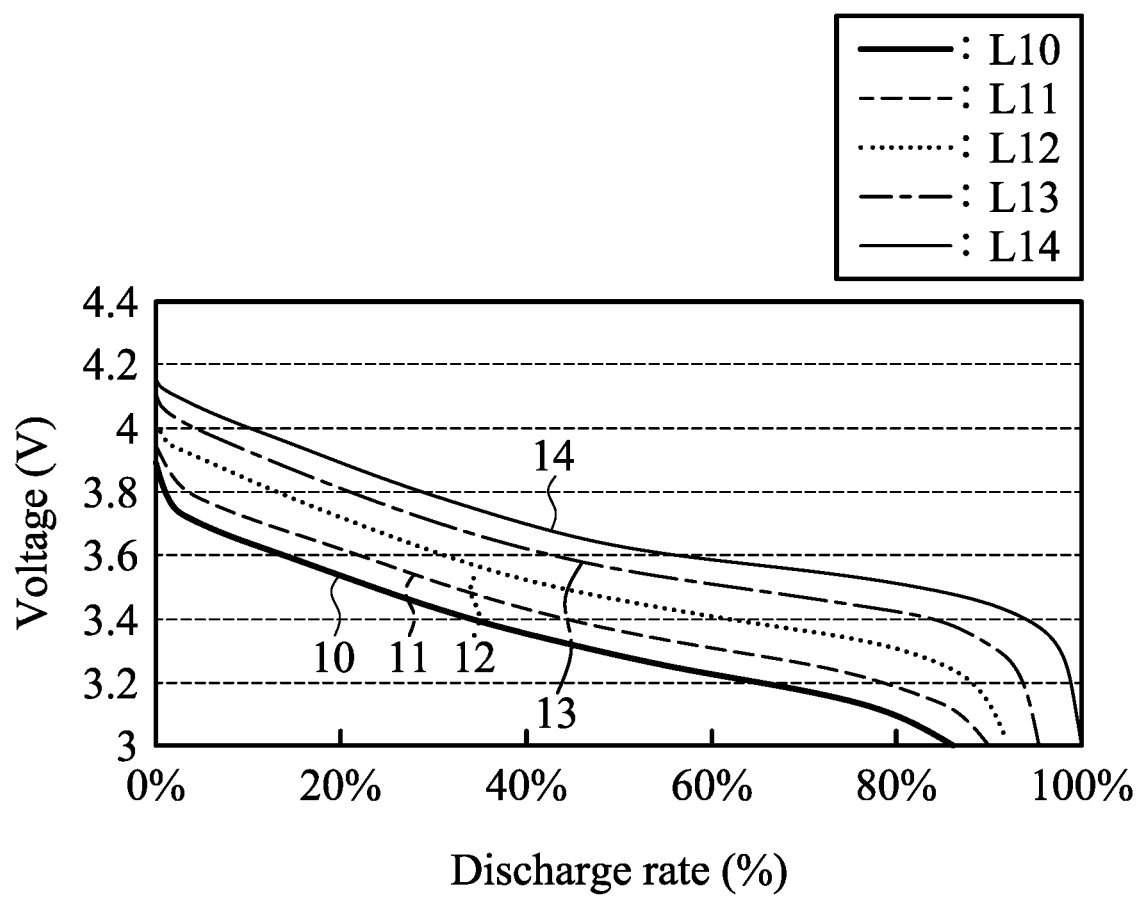
FIG. 1 shows, for the same lithium battery pack, falling curves of a voltage of a lithium battery cell at different loads.
Figure 2:
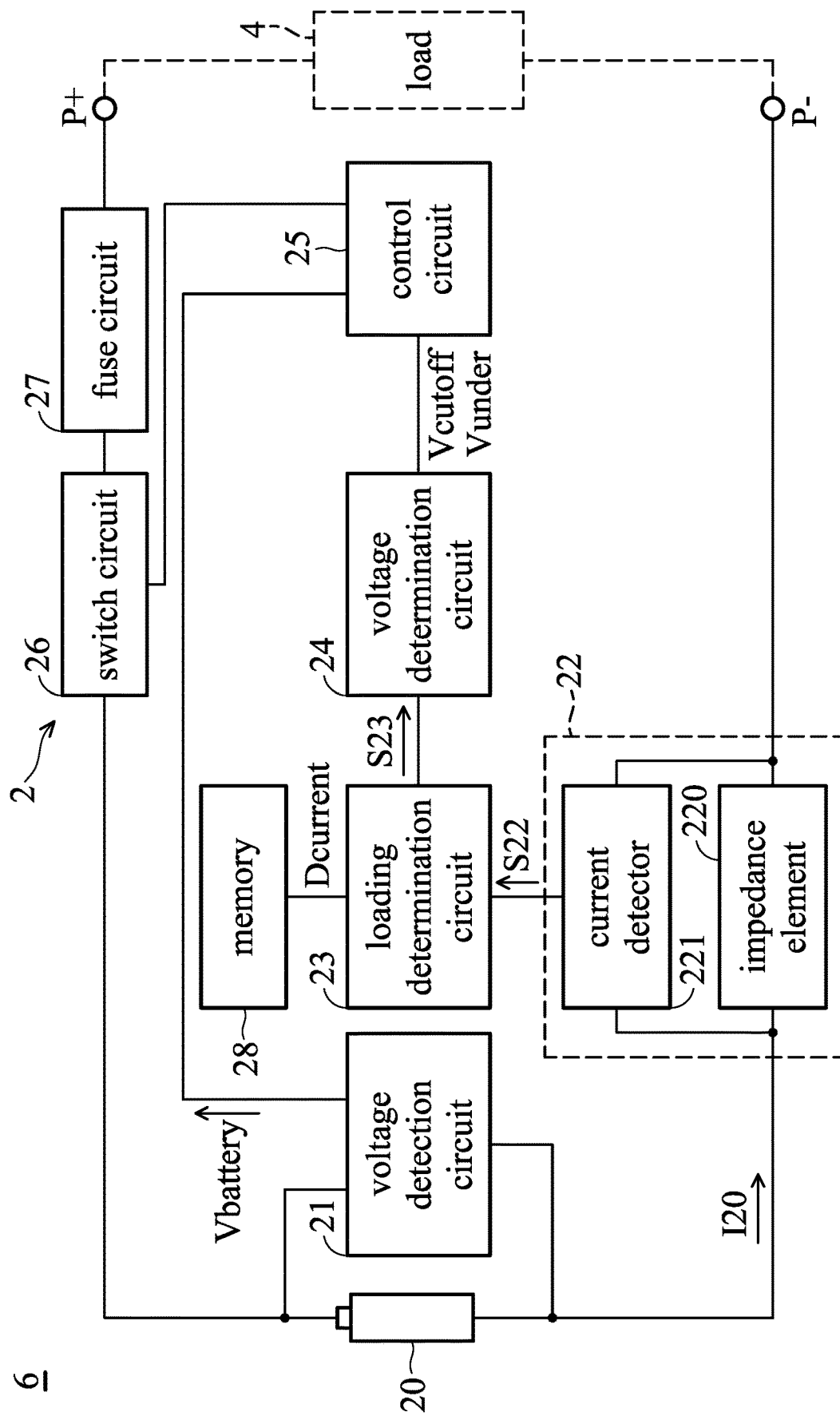
FIG. 2 shows an exemplary embodiment of a power supply device.

FIG. 2 shows an exemplary embodiment of a power supply device. Referring to FIG. 2, the power supply device 2 is coupled to a load 4 through a positive output port P+ and a negative output port P−. The power supply device 2 and the load 4 form an electronic device 6. The electronic device 6 may be a smart phone, a tablet computer, a notebook computer, a digital camera, or the like. When the power supply device 2 is in a discharging mode, the power supply device 2 provides power to the load 4 through the positive output port P+ and the negative output port P− (that is, the power supply device 2 can be discharged through the load 4). The load 4 executes an operating system and/or various application programs to implement various tasks. The load 4 has a corresponding loading depending on the number and/or kinds of tasks that it is performing. In the discharge mode, the larger the load, the larger the current drawn by the load 4 from the power supply device 2. Therefore, the magnitude of the discharging current 120 provided to the load 4 from the power supply device 2 may represent the loading of the load 4. In detail, the loading is proportional to the discharge current 120. In an embodiment, the load 4 may be a processor. In the following, a processor is given as an example for the load 4.

Referring to FIG. 2, the power supply device 2 comprises a battery cell 20 and a power management circuit composed of a voltage detection circuit 21, a current detection circuit 22, a loading determination circuit 23, a voltage determination circuit 24, a control circuit 25, a switch circuit 26, a fuse circuit 27, and a memory 28. The anode of the battery cell 20 is coupled to the positive output terminal P+ through the switch circuit 26 and the fuse circuit 27, and the cathode of the battery cell 20 is coupled to the negative output terminal P−. In this embodiment, the battery cell 20 is a lithium battery having a predetermined default capacity, for example, 1000 mAh, which is expressed in 1 C. The memory 28 stores the relevant parameters of the battery cell 20, for example, the default voltage and the default capacity. The current detection circuit 22 is coupled between the cathode of the battery cell 20 and the negative output terminal P−. When the power supply device 2 is in the discharging mode, the current detecting circuit 22 performs a current detection operation to detect the discharging current 120 provided to the load 4. In the embodiment of FIG. 2, the current detection circuit 22 includes an impedance element 220 and a current detector 221. In an embodiment, the impedance element 220 is a resistor having a fixed impedance value, which is coupled between the cathode of the battery cell 20 and the negative output terminal P−. The current detector 221 is coupled to two terminals of the impedance element 220. According to the current detection operation of the embodiment, the current detector 221 measures the cross-voltage between the two terminals of the impedance element 220 at each first predetermined interval. Each time the cross-voltage of the impedance element 200 is measured, the current detector 221 calculates a current discharge-current value (for example, in units of mA) of the discharge current 120 according to the measured cross-voltage of the impedance and the impedance value of the impedance element 220. The current detector 221 generates a discharge-current signal S22 according to the discharge-current value which is calculated each time.

The loading determination circuit 23 receives the discharge-current signal S22 and performs a loading determination operation according to the discharge current signal S22. According to the loading determination operation of the embodiment, the loading determination circuit 23 retrieves a discharge-current value Dcurrent from the discharge-current signal S22 at each second predetermined interval and stores the retrieved discharge-current value Dcurrent in the memory 28. In the embodiment, the first predetermined interval is equal to or shorter than the second predetermined interval. In an embodiment, the second predetermined interval is 250 ms (milliseconds). Whenever the current discharge-current value is retrieved, the loading determination circuit 23 reads the previous discharge-current value from the memory 28 and calculates the average value of the current discharge-current value and the previous discharge-current value to obtain a corresponding average discharge-current value. Then, the loading determination circuit 23 calculates the ratio of the average discharge-current value to the default capacity (1 C) of the battery cell 20 (for example, read from the memory 28) to obtain the current discharge rate (in units of C). According to the above description, the loading is proportional to the corresponding discharge-current value. Therefore, the discharge rate obtained from the average discharge-current value can represent the current loading. The loading determination circuit 23 sets the calculated discharge rate as a loading value (in units of C) indicating the current loading, and generates a loading signal S23 according to the loading value obtained each time, thereby accomplishing the loading determination operation.

The voltage determination circuit 24 receives the loading signal S23 and performs a voltage determination operation according to the loading signal S23. According to the voltage determination operation of the embodiment, the voltage determination circuit 24 retrieves a loading value from the loading signal S23 at each second predetermined interval. The voltage determination circuit 24 performs a comparison operation on the retrieved loading value. According to the embodiment, the voltage determination circuit 24 compares each retrieved loading value with at least one threshold and determines a voltage value according to the comparison result. In the embodiment, when the loading value is larger, the determined voltage is higher. The voltage determination 24 further detects the relative state-of-charge (RSOC) of the battery cell 20 to generate a corresponding state value. When determining the above voltage value, the voltage determination circuit 24 determines whether the current state value is smaller than or equal to a first state threshold. For example, in an embodiment, the state value is expressed as a percentage, and the first state threshold is equal to ten percent (10%). When the current state value is smaller than or equal to the first state threshold, the voltage determination circuit 24 sets the level of the cut-off voltage to be equal to the above determined voltage value, thereby accomplishing the voltage determination operation. When the current state value is not smaller than or not equal to the first state threshold, the voltage determination circuit 24 continues to retrieve a loading value from the loading signal S23 at each second predetermined interval and performs the comparison operation until the state value is less than or equal to the first state threshold. According to the voltage determination operation of the embodiment, after the cut-off voltage is determined, the voltage determination circuit 24 further determines a threshold voltage Vunder for starting an under-voltage protection operation of the battery cell 20 according to the determined cut-off voltage. The voltage determination circuit 24 transmits the determined cut-off voltage Vcutoff and the determined threshold voltage Vunder of the under-voltage protection operation to the control circuit 25.

The voltage detection circuit 21 is coupled to the anode and the cathode of the battery cell 20 to instantaneously measure the voltage (battery voltage) Vbattery of the battery cell 20. The voltage detection circuit 21 provides the measured voltage Vbattery to the control circuit 25. The control circuit 25 determines whether to terminate the discharge of the battery cell 20 based on the received voltage Vbattery and the cut-off voltage Vcutoff. In detail, the control circuit 25 monitors the voltage Vbattery, and when the voltage Vbattery drops to be equal to the cut-off voltage Vcutoff, the control circuit 25 controls the switch circuit 26 to be turned off. As a result, an open circuit is formed between the anode of the cell 20 and the positive output terminal P+, so that the battery cell 20 is no longer discharged through the load 4, that is, the power is no longer supplied to the load 4, thereby terminating the battery cell 20 being discharged through the load 4. In addition, the control circuit 25 determines whether to perform the under-voltage protection operation based on the received voltage Vbattery and the threshold voltage Vunder. In detail, the control circuit 25 monitors the voltage Vbattery, and when the voltage Vbattery drops to be equal to the threshold voltage Vunder, the control circuit 25 activates the under-voltage protection operation to prevent the battery cell 20 from permanently failing.

According to the above description, the power supply device 2 disclosed in the present invention can change the cut-off voltage of the battery cell 20 according to the loading of the load 4 which is powered by the power supply 2 and can change the threshold voltage for the under-voltage protection operation. As a result, the battery capacity of the battery cell 20 can be fully utilized even if the load 4 has a large loading, thereby enhancing the efficiency of the power supply device 2. In the embodiment, each of the cut-off voltage Vcutoff and the threshold voltage Vunder for the under-voltage protection operation which are determined according to the loading is greater than or equal to the threshold voltage for starting the shutdown mode of the battery cell 20.

Figure 3A:
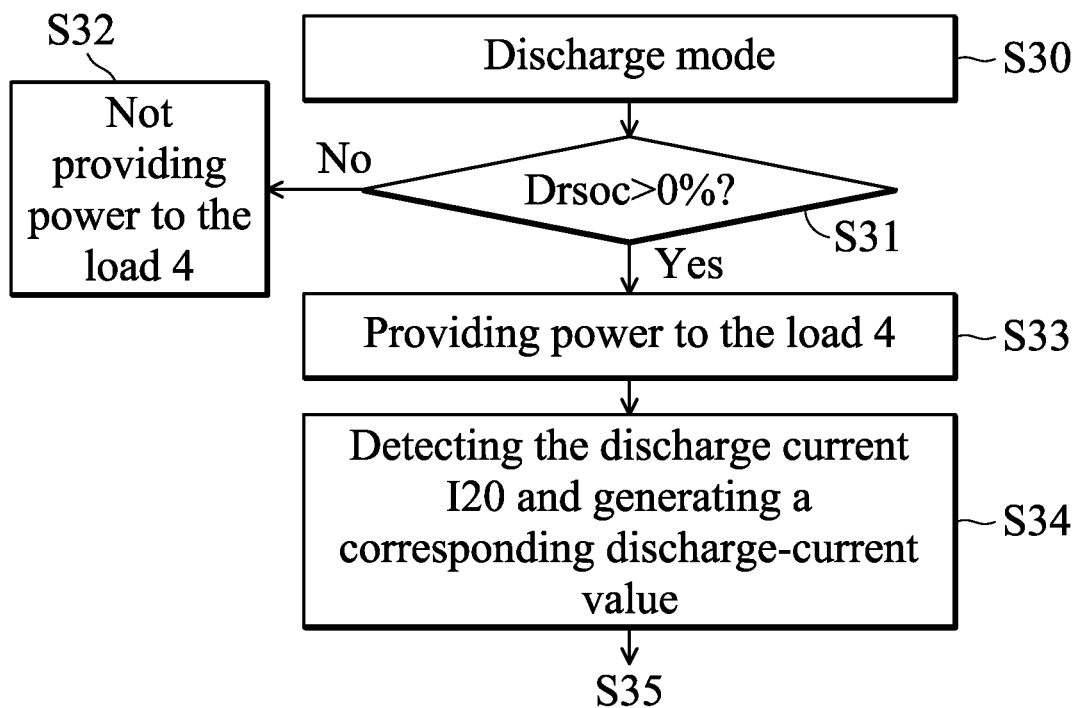
FIGS. 3A-3B show a flow chart of an exemplary embodiment of a power management method.
Figure 3B:
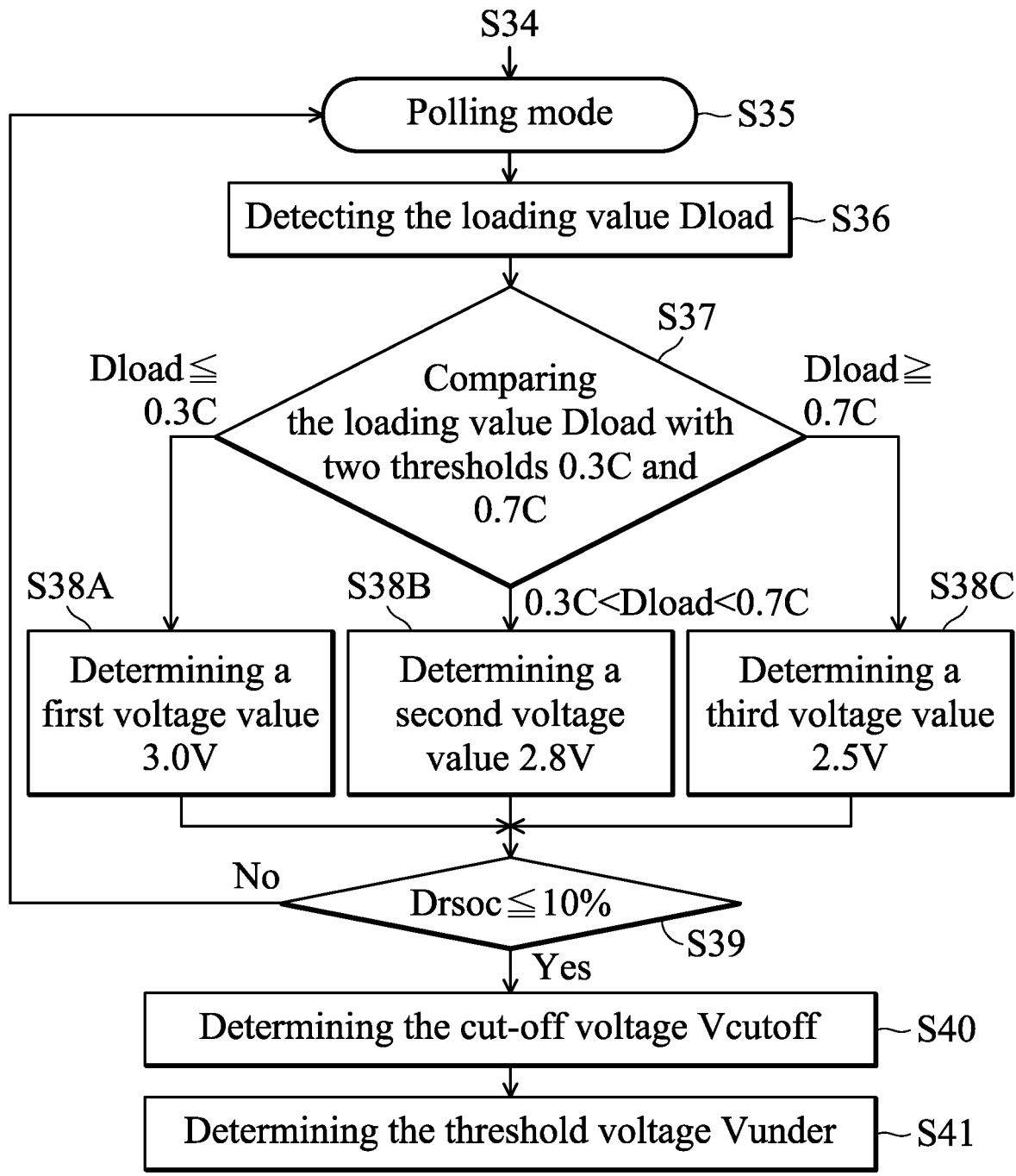

FIGS. 3A-3B show a flow chart of an exemplary embodiment of a power management method. In the following, how to determine the cut-off voltage will be explained with reference to FIG. 2 and FIGS. 3A-3B.

Referring to FIG. 2 and FIGS. 3A-3B, when the power supply device 2 is not connected to the AC power source (i.e., the battery cell 2 is not in the charge mode) while it is coupled to the load, the power supply device 2 enters the discharge mode (step S30). At this time, the control circuit 25 first determines whether the state value Drsoc of the current relative charge state (RSOC) of the battery cell 20 is greater than a state threshold, for example, 0% (referred to as a second state threshold) (step S31). When the control circuit 25 determines that the current state value Drsoc is not greater than the state threshold 0% (step S31—NO), the power supply device 2 does not provide power to the load 4 (step S32), and therefore, the load 4 cannot be started or turned on. When the current state value Drsoc is greater than the state threshold 0% (step S31—Yes), the control circuit 25 controls the power supply device 2 to start providing power to the load 4 (step S33), so that the load 4 starts operating. At this time, a discharge current I20 flowing through the impedance element 220 is generated. The current detection circuit 22 performs the above-described current detection operation to detect the discharge current I20 and generates a corresponding discharge-current value according to the detected the discharging current I20 (Step S34). In an embodiment, the current detector 221 measures the cross-voltage between the two terminals of the impedance element 220 once at each first predetermined intervals and calculates a current discharge-current value of the discharge current I20 according to the measured cross-voltage of the impedance which is measured each time and the impedance value of the impedance element 220.

Then, the power management method goes to a polling mode (step S35) to perform steps S35-S39. In an embodiment, the loading determination circuit 23 performs the above-described loading determination operation at each second predetermined interval and obtains the current loading value Dload (in units of C) by calculating the corresponding discharge rate (step S36). When the current loading value Dload is obtained, the voltage determination circuit 24 performs the above-described voltage determination operation. During the voltage determination operation, the voltage determination circuit 24 compares the current loading value Dload with at least one threshold and determines a voltage value according to the comparison result. In an embodiment, the voltage determination circuit 24 compares the current loading value Dload with two thresholds 0.3 C and 0.7 C (step S37). When the loading value Dload is smaller than or equal to the threshold 0.3 C (Dload≤0.3 C), the voltage determination circuit 24 determines a first voltage value (step S38A). When the loading value Dload is greater than the threshold 0.3 C and less than the threshold 0.7 C (0.3 C<Dload<0.7 C), the voltage determination circuit 24 determines a second voltage value (step S38B). When the loading value Dload is greater than or equal to the threshold 0.7 C (Dload≥0.7 C), the voltage determination circuit 24 determines a third voltage value (step S38C). In the embodiment, referring to Table 1, the first voltage is greater than the second voltage, and the second voltage is greater than the third voltage. For example, the first voltage is 3.0V, the first voltage is 2.8V, and the third voltage is 2.5V.

After determining a corresponding voltage value according to the current loading value Dload, the voltage determination circuit 24 further determines whether the state value Drsoc of the current relative charge state (RSOC) of the battery cell 20 is less than or equal to another state threshold, for example is 10% (referred to as a first state threshold) (step S39). When the state value Drsoc is less than or equal to the state threshold 10% (step S39—Y), the power management method leaves the polling mode, and the voltage determination circuit 24 sets the cut-off voltage Vcutoff to be equal to the determined voltage value (3V or 2.8V or 2.5V, see Table 1), that is, the cut-off voltage Vcutoff is determined (step S40). When the state value Drsoc is not less than or equal to the state threshold 10% (step S39—NO), the polling mode is continued until the state value Drsoc is less than or equal to the state threshold 10%. Thereafter, the voltage determination circuit 24 further determines the threshold voltage Vunder of the under-voltage protection operation according to the determined cut-off voltage Vcutoff (step S41). According to the embodiment, both the cut-off voltage Vcutoff and the threshold voltage Vunder must be greater than or equal to the threshold voltage Vsd for starting the shutdown mode of the battery cell 20. In an embodiment, referring to Table 1, in the cases where it is assumed that the threshold voltage Vsd for starting the shutdown mode is 2.5V, the threshold voltage Vunder is determined to be 2.8V when the cut-off voltage Vcutoff is 3.0V; the threshold voltage Vunder is determined to be 2.6V when the cut-off voltage Vcutoff is 2.8V; the threshold voltage Vunder is determined to be 2.5V when the cut-off voltage Vcutoff is 2.5V.

TABLE 1

|  | Dcurrent ≤ 0.3 C | 0.3 C < Dcurrent < 0.7 C | Dcurrent ≥ 0.7 C |
| --- | --- | --- | --- |
| Vcutoff | 3.0 V | 2.8 V | 2.5 V |
| Vunder | 2.8 V | 2.6 V | 2.5 V |
| Vsd | 2.5 V | 2.5 V | 2.5 V |

According to the power management circuit and method disclosed in the present invention, the cut-off voltage of the battery cell 20 and the threshold voltage for the under-voltage protection operation may be dynamically changed according to the loading of the load 4. As a result, the battery capacity of the battery cell 20 can be fully utilized even if the load 4 has a large loading, thereby enhancing the efficiency of the power supply device 2.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power management circuit for a battery cell coupled to a load through an output terminal comprising:

a current detection circuit detecting a discharge current of the battery cell when the battery cell is discharged through the load to generate a discharge-current signal;

a loading determination circuit determining a loading value of the load according to the discharge-current signal to generate a loading signal; and a voltage determination circuit receiving the loading signal and determining a cut-off voltage of the battery cell according to the loading signal, wherein when the battery voltage of the battery cell drops to the cut-off voltage, the power management circuit terminates the discharge of the battery cell through the load, wherein the current detection circuit comprises:

an impedance element, coupled between the battery cell and the output terminal, having an impedance value; and a current detector coupled to the impedance, wherein when the battery cell is discharged through the load, the current detector measures a cross-voltage between two terminals of the impedance and calculates a discharge-current value according to the measured cross-voltage and the impedance value, and wherein the current detector generates the discharge-current signal according to the calculated discharge-current value.

2. The power management circuit as claimed in claim 1, wherein the loading determination receives the discharge-current signal, wherein the loading determination circuit retrieves the discharge-current value from the discharge-current signal at each predetermined interval and calculates an average value of the currently retrieved discharge-current value and the previously retrieved discharge-current value to obtain an average discharge-current value, wherein the loading determination circuit calculates a ratio of the average discharge-current value to a default capacity of the battery cell to obtain a discharge rate and sets the discharge rate as the loading value, and wherein the loading determination circuit generates the loading signal according to the loading value which is obtained each time.

3. The power management circuit as claimed in claim 1, wherein when the battery cell is discharged through the load, the voltage determination circuit performs a comparison operation at each predetermined interval to compare the loading value with at least one loading threshold and generates a comparison result, wherein each time that the comparison result is generated, the voltage determination circuit determines a voltage value according to the corresponding comparison result, wherein each time that the voltage value is determined, the voltage determination circuit determines whether a state value representing a relative state-of-charge (RSOC) of the battery cell is smaller than or equal to a first state threshold, and wherein when the state value is smaller than or equal to the first state threshold, the voltage determination circuit sets a level of cut-off voltage to be equal to the determined voltage value.

4. The power management circuit as claimed in claim 3, wherein the state value is expressed as a percentage, and the first state threshold is equal to ten percent (10%).

5. The power management circuit as claimed in claim 3, wherein when the state value is not smaller than or not equal to the first state threshold, the voltage determination circuit performs the comparison operation continuously.

6. The power management circuit as claimed in claim 3 further comprising:

a control circuit determining whether the state value is greater than a second state threshold, wherein the second state threshold is smaller than the first state threshold, and wherein when the state value is greater than the second state threshold, the control circuit controls the battery cell to be discharged through the load.

7. The power management circuit as claimed in claim 6, wherein the state value is expressed as a percentage, and the first state threshold is equal to zero percent (0%).

8. The power management circuit as claimed in claim 1, wherein the voltage determination circuit determines a threshold voltage for starting an under-voltage protection operation of the battery cell according to the determined cut-off voltage.

9. The power management circuit as claimed in claim 1, wherein when the determined loading value is larger, the voltage determination circuit determines that the cut-off voltage has a lower level.

* * * * *